(12) United States Patent
Des Roches et al.

(10) Patent No.: US 8,419,369 B2
(45) Date of Patent: *Apr. 16, 2013

(54) AXIAL FLOW HYDRAULIC TURBINE WITH FIXED BLADES BOLTED-ON

(75) Inventors: Benoit Des Roches, Quebec (CA);
Vincent Francou, Quebec (CA);
Christine Monette, Quebec (CA); Eric Ferland, Quebec (CA)

(73) Assignee: Andritz Technology and Asset Management, Graz (AT)

( * ) Notice: Subject to any disclaimer, the term of this patent is extended or adjusted under 35 U.S.C. 154(b) by 1043 days.

This patent is subject to a terminal disclaimer.

(21) Appl. No.: 12/051,944

(22) Filed: Mar. 20, 2008

(65) Prior Publication Data

US 2009/0092495 A1    Apr. 9, 2009

(30) Foreign Application Priority Data

Oct. 5, 2007  (CA) .................................... 2605807

(51) Int. Cl.
 *F03B 3/00* (2006.01)
(52) U.S. Cl.
 USPC ..................................................... 416/219 R

(58) Field of Classification Search ............. 416/204 R, 416/205, 207, 220 A, 219 A, 239, 244 R, 416/246, 248, 220 R, 158, 2, 210 R, 245 A, 416/245 B, 215
See application file for complete search history.

(56) References Cited

U.S. PATENT DOCUMENTS

| | | | | |
|---|---|---|---|---|
| 2,368,656 A * | 2/1945 | Gaskell et al. | ............. | 416/214 R |
| 2,751,189 A * | 6/1956 | Ledwith | ......................... | 416/217 |
| 2,983,320 A * | 5/1961 | Uhrich et al. | ................. | 416/205 |
| 3,470,843 A * | 10/1969 | Satterthwaite et al. | .......... | 440/49 |
| 3,557,744 A * | 1/1971 | Herbert | ........................... | 440/79 |
| 4,012,170 A | 3/1977 | Grubb | | |
| 4,256,435 A * | 3/1981 | Eckel | ......................... | 415/209.1 |
| 5,611,665 A * | 3/1997 | Angel | ................................ | 416/1 |
| 5,947,679 A * | 9/1999 | Cybularz et al. | ................ | 415/17 |
| 5,997,253 A * | 12/1999 | Feehan | .......................... | 416/207 |
| 6,247,893 B1 | 6/2001 | Beyer et al. | | |

* cited by examiner

*Primary Examiner* — Edward Look
*Assistant Examiner* — Christopher R Legendre
(74) *Attorney, Agent, or Firm* — Nixon & Vanderhye P.C.

(57) ABSTRACT

A hydraulic turbine has a runner blade bolted to a hollow runner hub. The runner blade has a flange that mates with a corresponding recess on the hub. Bolting connections pass through complementary array like patterns of apertures spread across and in the hub and blade flange to attach the blades to the hub.

5 Claims, 4 Drawing Sheets

AXIAL FLOW HYDRAULIC TURBINE WITH FIXED BLADES BOLTED-ON

RELATED APPLICATION

The subject application is related to co-pending application Ser. No. 12/051,940 filed concurrently herewith for "Axial Flow Hydraulic Turbine with Blade Mounting" for the same inventors and assignee as herein.

FIELD OF THE INVENTION

The present invention relates to axial flow hydraulic turbines assembled by bolting the runner blades in to a runner hub of the turbine.

BACKGROUND OF THE INVENTION

In the manufacture of hydraulic machine runners for turbines, it is known to bolt the runner blades of the turbine onto the runner hub of the turbine with fitted studs and nuts. Typically the hub is hollow and has an outer surface that is conical, cylindrical or spherical in shape. The blade is provided with a circular shaped flange which is bolted to the outer surface of the runner hub by a series of studs and nuts arranged in a single circle that pass through the runner hub and into the flange or trunnion of the runner blade. The bolted connection has the advantages that it allows for an easy adjustment of the blade angle to meet homology requirements during the assembly of the hydraulic turbine, it reduces runner size for transportation and it reduces welding requirements during manufacturing process.

In some hydraulic turbine assemblies, space limitations within the runner hub prevent a sufficient number of bolting connections, arranged in the circular pattern, to pass through the hub and into the circular flange. As a result, in some applications it may not be possible to ensure proper fatigue life of the bolting by flange pre-loading. Further, when the space limitations result in the flange having a smaller diameter than desired, stress levels in the flange can rise over acceptable limits. In these instances the runners are usually assembled without the use of bolting and by welding the runner blades to the runner hub or with the use of segmented casting that is united with shrink rings or welding. However the assembly by welding or segmented casting does not lend itself readily to use in hydraulic turbines which cannot be completely manufactured in a plant due to their size and shipping considerations. In many instances, the hydraulic turbine must be shipped in sections and assembled at site. This is due to the fact that bridge clearances, tunnel sizes, track spacing and other factors all operate to limit the size of articles which can be shipped over any given route. Clearly, the bolted connection of the runner blade to the runner hub is a desirable method of assembling hydraulic turbines that are capable of being pre-assembled in a manufacturing plant, disassembled for shipment and reassembled at the site. Any improvements in this connection would be desirable.

BRIEF DESCRIPTION OF THE INVENTION

In one embodiment of the present invention there is provided an axial flow hydraulic turbine with fixed blade mounting comprising a plurality of runner blades. Each of the runner blades comprises a mounting flange comprising a hub abutting surface portion. The hub mounting flange comprises a plurality of threaded flange apertures extending from the hub abutting surface portion into the mounting flange. The plurality of threaded flange apertures are grouped spread across the hub abutting surface portion in a first array like pattern. The turbine further comprises a hollow hub for supporting the runner blades and comprising a central opening and an outer surface portion having a plurality of recesses. Each of the recesses has a flange seating surface portion for seating a corresponding hub abutting surface portion of the mounting flange. The recess has a plurality of hub apertures extending from the flange seating surface portion through the hollow hub and opening into the central opening. The plurality of hub apertures are grouped and spread across the flange seating surface portion in a second array like pattern. Each of the hub apertures in the second array like pattern aligns with a corresponding one of the threaded flange apertures of the first array like pattern whereby the first and second array like patterns are complementary. A plurality of bolting connections are provided, one for each aligned hub aperture and threaded flange aperture, for securing the plurality of runner blades to the hollow hub. Each bolting connection has a bolt head-like portion located within the central opening of the hollow hub and has a threaded shaft portion extending through a corresponding aligned hub aperture and threaded flange aperture for threading engagement with the threaded flange aperture.

By grouping the threaded flange apertures and the hub apertures in complementary first and second array like patterns, the bolting connections are spread across the hub and flange further from the center of the connections thereby improving bolt group inertia and insuring total bolt clamp force may avoid surface separation between the blade flange and hub in all operating conditions.

In one embodiment, each of the bolting connections comprises a stud comprising the threaded shaft portion and a nut comprising the bolt head-like portion rotated onto an end of the stud passing into the central opening of the hollow hub.

It is envisaged that the first array like pattern and the second array like pattern each comprise one pattern chosen from the group consisting of 1) at least two concentric circular patterns, 2) an matrix array pattern, and 3) at least two concentric rectangular patterns.

In another embodiment, the first and second array like patterns comprise incomplete patterns.

BRIEF DESCRIPTION OF THE DRAWINGS

For a better understanding of the nature and objects of the present invention reference may be had to the following detailed description when taken in conjunction with the accompanying diagrammatic drawings in which.

DETAILED DESCRIPTION OF THE INVENTION

Figure 1:
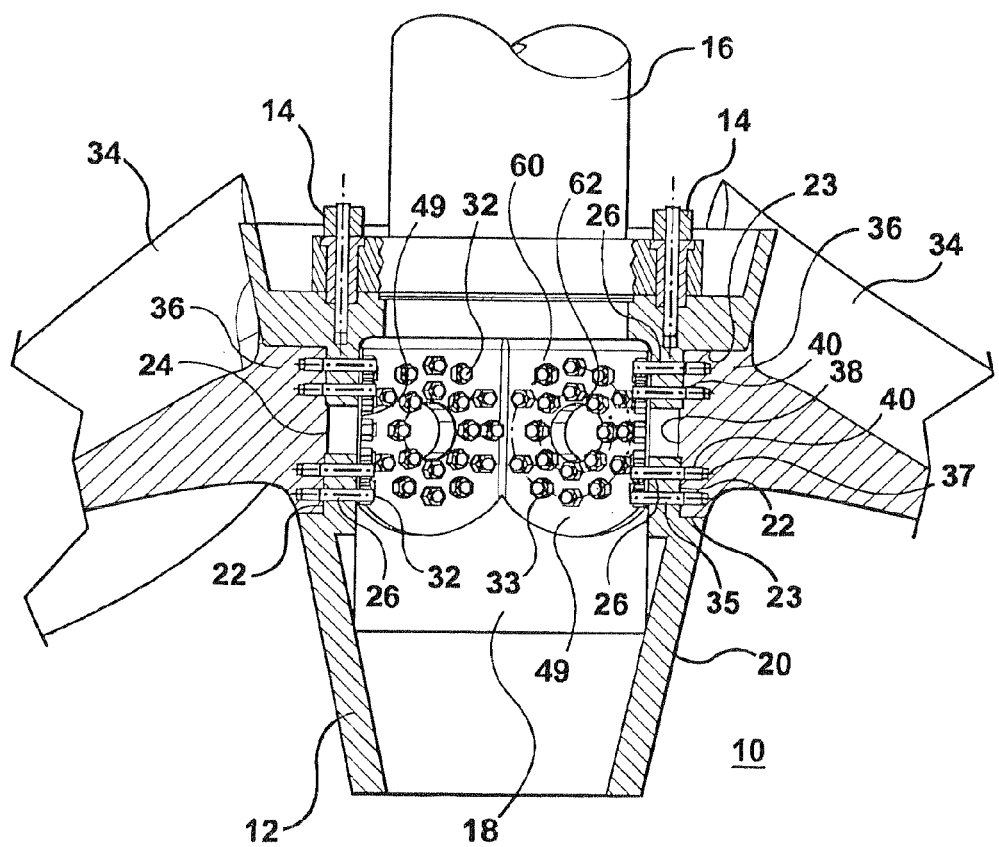
FIG. 1 is a sectional assembly view of the turbine hub and runner blades.

Referring to the Figures, the present invention relates to a hydraulic turbine 10 having runner blades 34 assembled to a hollow runner hub 12 for a fixed blade axial flow turbine. In the figures shown, the blades 34 form part of a diagonal turbine runner. It should be understood that the fixed blades 34 may form part of a propeller turbine runner (not shown). The hub 12 is connected by studs and nuts 14 to a prime mover or shaft 16. The hub 12 has a central opening 18 and a non-planar outer surface portion 20 that is generally conical, in shape and may be cylindrical or spherical depending on the turbine design. The hub 12 comprises a plurality of recesses 22, one for each blade 34, which recesses 22 are machined into the surface 20 of the hub 12 and define a protruding lip 23 that at least partially, if not fully, surrounds the recess 22.

Figure 2:
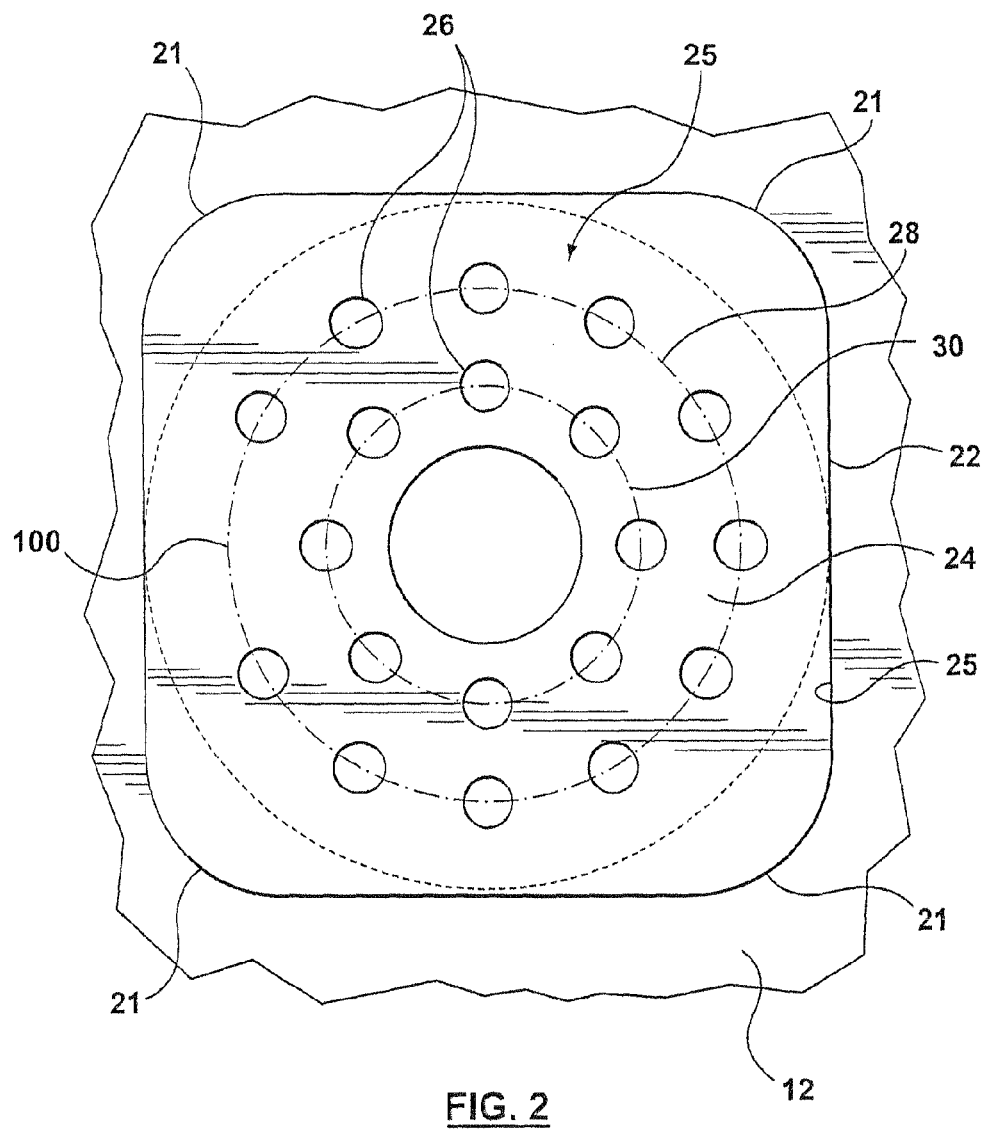
FIG. 2 is a front view of a portion of the outer surface portion of the hub of the turbine.
Figure 3:
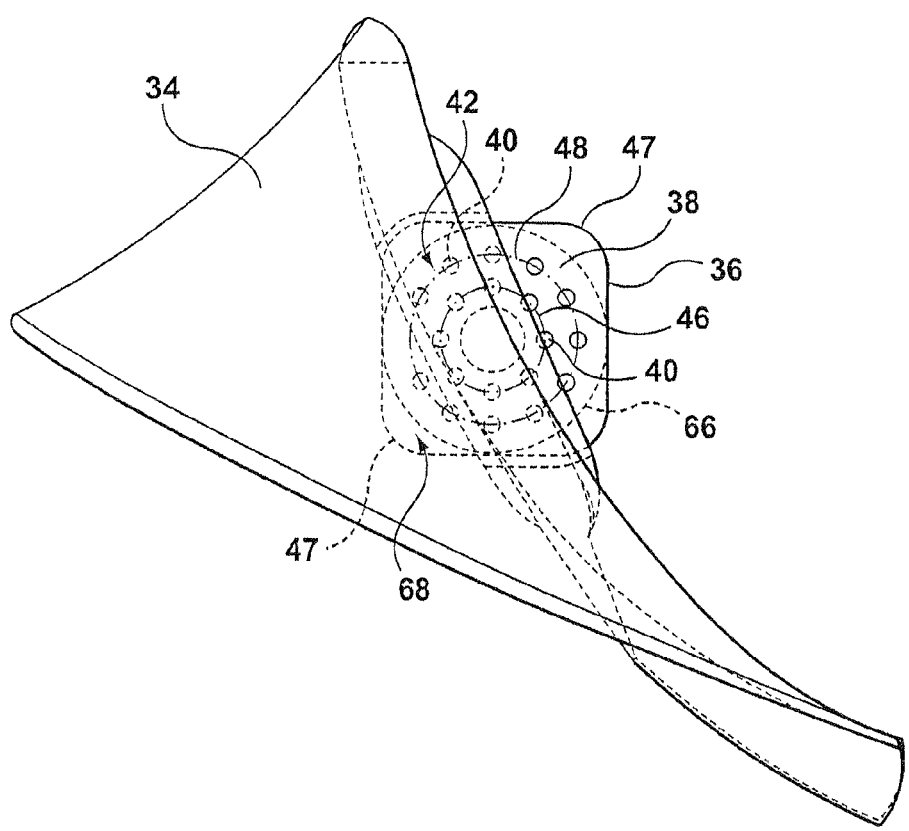
FIG. 3 is an isometric view of one of the turbine blades.
Figure 4:
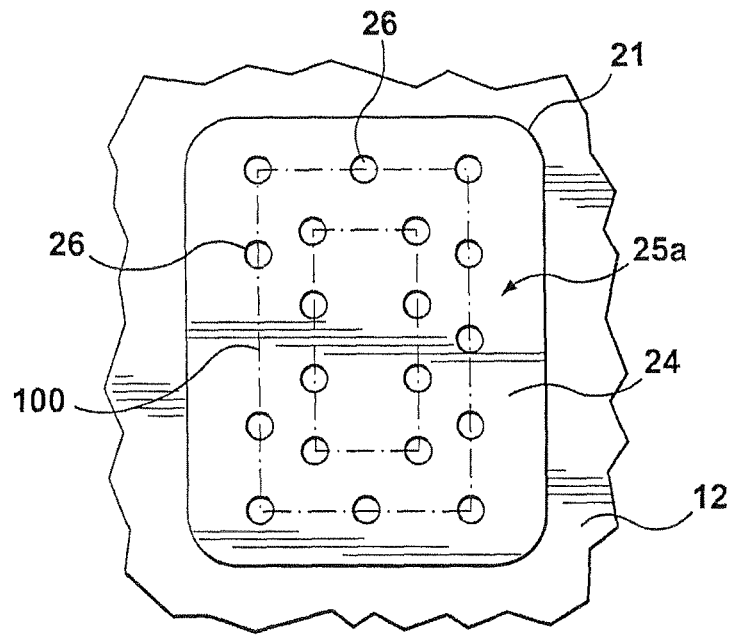
FIGS. 4 and 5 illustrate alternative aperture patterns.
Figure 5:
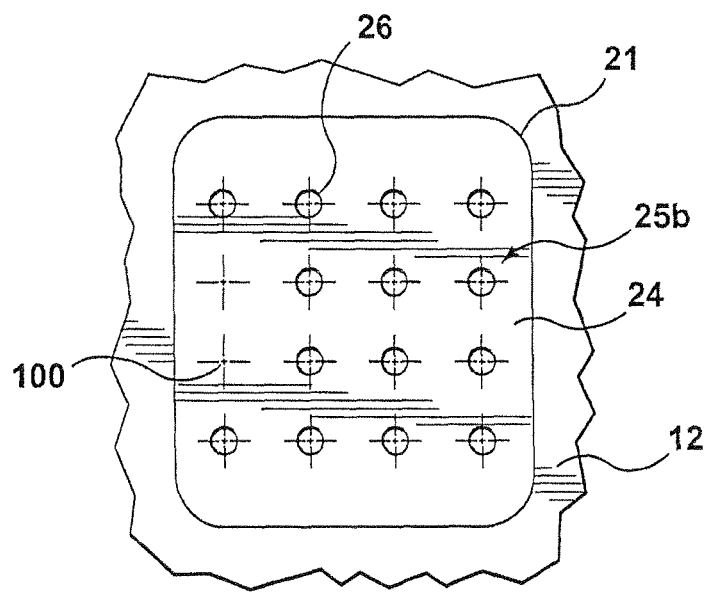

Referring to FIGS. 1 and 2, the hub recess 22 is shown to comprise a flange seating surface portion 24 which is preferably planar and has a generally rectangular shape in the form of a square with corners 21 machined with a small radius. The flange seating surface portion 24 acts as a seat for the a mounting flange 36 of the runner blade 34 (FIGS. 1 and 3). The recess 22 has a plurality of hub apertures 26 that are bored to extend from the flange seating surface portion 24 through the hub 12 and open into the central opening 18. The hub apertures 26 are grouped spread across the planar flange seating surface portion 24 in an array like pattern 42 of two concentric circular patterns 28, 30 (FIG. 2). As seen in FIGS. 4 and 5 other array-like patterns for the hub apertures 26 may comprise concentric rectangular patterns 25*a* in FIG. 4 and a matrix array pattern 25*b* as in FIG. 5. Further, it should be understood that these patterns may be incomplete in that an aperture in the pattern may be omitted (such as shown at designation 100 in FIGS. 2, 4 and 5) due to space limitations discussed hereinafter.

Referring to FIGS. 1 and 3, the hub mounting flange 36 of the runner blade 34 comprises a hub abutting surface portion 38 which is preferably planar and has a generally rectangular shape in the form of a square machined with a small radius corners 47. The shape of the flange seating surface portion 24 and that of the hub abutting surface portion 38 are preferably complementary to each other so as to provide for good seating of the mounting flange 36 within the recess 22 with the lip 23 of the recess 22 at least partially surrounding sides of the mounting flange 36. The runner blades 34 comprise a plurality of threaded flange apertures 40 formed by drilling, reaming and tapping to final size. The threaded apertures 40 extend from the hub abutting surface portion 38 into mounting flange 36 of the runner blade 34. The plurality of threaded flange apertures 40 are grouped and spread across the hub abutting surface portion 38 in an array-like pattern 42. In the embodiment shown the array-like pattern 42 comprises two concentric circular or array patterns 46, 48 (FIG. 3). It should be understood that more than two concentric circular patterns (see circular region 66) may be used depending on the area 68 available in the hub abutting surface portion 38. The array-like pattern 25 of the hub apertures 26 is arranged to align with array-like pattern 42 of the corresponding threaded flange apertures 40. It should be understood that if the array-like patterns 25*a* and 25*b* of FIGS. 4 and 5 for the hub apertures 26 are used, then complementary array-like patterns (not shown) would be found on the hub abutting surface portion 38 for the threaded flange apertures 40.

As shown in FIG. 1, the inner surface of the hub 12 is provided with relatively flat surface portions 49 which are surfaces located on the opposite side of the planar flange seating surface portion 24 of the recess 22.

Bolting connections 32 shown in FIG. 1 pass through a corresponding aligned hub apertures 26 and threaded flange apertures 40 so as to secure the runner blades 34 to the hub 12. Each bolting connection 32 has a bolt head portion or nut 33 that is located within the central opening 18 of the hollow hub 12 and is tightened against a flat surface portion 49. Each bolting connection 32 has a stud 37 with threaded shaft portion 35 that extends through a corresponding aligned aperture 26 and into threaded flange aperture 40 for threading engagement with the threaded flange aperture 40. The threaded shaft portion 35 of the stud 37 may be continuous or have a middle portion not threaded allowing a wrench to be used against the non threaded portion to secure the stud 37 into the threaded aperture 40 of flange 36. Otherwise two nuts can be threaded onto the stud together, locked and temporarily used to secure the studs 37 in the flange 36. As shown in FIG. 1, the bolting connections 32 are arranged in two concentric circular patterns 60, 62 for each blade 34. Other array bolting patterns may be used which would correspond to patterns shown in FIGS. 4 and 5.

In some instances, due to space limitations inside of the hub 12, there may be insufficient area for a bolting connections 32 to be used where adjacent flat surface portions 49 meet. Accordingly, no bolting connection 32 is used and associated apertures through the hub 12 and into the mounting flange 36 are not required leading to the aperture patterns through the hub 12 and into the flange 36 being incomplete.

The nuts 33 and studs 37 are installed from inside the hollow hub 12. Tightening of the nuts 33 or stud 37 brings the planar hub abutting surface 38 of the mounting flange 36 into direct flat abutting contact with the planar flange seating surface portion 24 of the recess 22. The nuts 33 are tightened such that the contact pressure between the mounting flange 36 of the runner blades 34 and the recess 22 of the hollow hub 12 is a predetermined force leading to the highest forces in moments occurring on the bolting connections 32 in the two concentric bolting circles 60, 62 to prevent face separation. Blade angle is not adjustable.

While the invention has been described in terms of very specific embodiments, those skilled in the art will recognize that the invention can be practiced with modification that fall within scope of the appended claims.

What is claimed is:

1. An axial flow hydraulic turbine with fixed blade mounting comprising:

a plurality of runner blades for the hydraulic turbine, each of the runner blades comprising a mounting flange including a hub abutting surface portion, and a plurality of threaded flange apertures extending from the hub abutting surface portion into the hub mounting flange, wherein the hub abutting surface portion is non-circular in cross-section, and the plurality of threaded flange apertures being arranged across the hub abutting surface portion in a first array like pattern;

a hollow hub for supporting the runner blades and comprising a central opening and an outer surface portion, wherein the hub extends annularly as a continuous structure around an axis of the hub, the outer surface portion of the hub includes a plurality of recesses, each of the recesses having a flange seating surface portion for seating a corresponding hub abutting surface portion of the hub mounting flange, wherein the recess includes a sidewall extending around the flange seating surface portion and the sidewall is complementary to the non-circular cross-section of the hub abutting surface portion, and the recess having a plurality of hub apertures extending from the flange seating surface portion through the hollow hub and opening into the central opening, the plurality of hub apertures being arranged across the flange seating surface portion in a second array like pattern, each of the hub apertures in the second array like pattern aligning with a corresponding one of the threaded flange apertures of the first array like pattern; whereby the first and second array like patterns are complementary; and a plurality of bolting connections, one for each aligned hub aperture and threaded flange aperture, for securing the plurality of runner blades to the hollow hub, each bolting connection having a bolt head-like portion located within the central opening of the hollow hub and having a threaded shaft portion extending through a corresponding aligned hub aperture and threaded flange aperture for threading engagement with the threaded flange aperture.

2. The axial flow hydraulic turbine of claim 1 wherein each of the bolting connections comprises a stud comprising the threaded shaft portion and a nut comprising the bolt head-like portion rotated onto an end of the stud passing into the central opening of the hollow hub.

3. The axial flow hydraulic turbine of claim 1 wherein the first array like pattern and the second array like pattern each comprise one pattern chosen from the group consisting of 1) at least two concentric circular patterns, 2) an matrix array pattern, and 3) at least two concentric rectangular patterns.

4. The axial flow hydraulic turbine of claim 3 wherein the first and second array like patterns comprise incomplete patterns.

5. The axial flow hydraulic turbine of claim 4 wherein each of the bolting connections comprises a stud comprising the threaded shaft portion and a nut comprising the bolt head-like portion rotated onto an end of the stud passing into the central opening of the hollow hub.

\* \* \* \* \*